US012630086B2

(12) United States Patent
Fujiu

(10) Patent No.: US 12,630,086 B2
(45) Date of Patent: May 19, 2026

(54) INJECTION MOLDED BODY AND METHOD FOR MANUFACTURING SAME

(71) Applicant: MITSUBA Corporation, Gunma (JP)

(72) Inventor: Masaru Fujiu, Gunma (JP)

(73) Assignee: MITSUBA Corporation, Gunma (JP)

( * ) Notice: Subject to any disclaimer, the term of this patent is extended or adjusted under 35 U.S.C. 154(b) by 419 days.

(21) Appl. No.: 17/437,039

(22) PCT Filed: Oct. 14, 2020

(86) PCT No.: PCT/JP2020/038702
§ 371 (c)(1),
(2) Date: Sep. 7, 2021

(87) PCT Pub. No.: WO2021/075446
PCT Pub. Date: Apr. 22, 2021

(65) Prior Publication Data
US 2022/0176877 A1     Jun. 9, 2022

(30) Foreign Application Priority Data

Oct. 18, 2019     (JP) ................................. 2019-190674

(51) Int. Cl.
*B60R 1/06*     (2006.01)
*B29C 45/14*     (2006.01)
(Continued)

(52) U.S. Cl.
CPC .......... *B60R 1/06* (2013.01); *B29C 45/14065* (2013.01); *B29C 45/2602* (2013.01); *B29L 2031/3005* (2013.01)

(58) Field of Classification Search
CPC ................ B29C 45/14467; B29C 2045/14524
See application file for complete search history.

(56) References Cited

U.S. PATENT DOCUMENTS 4,261,947 A * 4/1981 Ogi ................... B29C 45/14467
                                                    264/263
2014/0272243 A1* 9/2014 Sato ........................ B29C 65/72
                                                    264/249

FOREIGN PATENT DOCUMENTS

EP         1902826     *  3/2008
EP         2292400     *  3/2011
          (Continued)

OTHER PUBLICATIONS

English machine translation of JP06179246 as found on google patents (Year: 2023).*

(Continued)

*Primary Examiner* — Edmund H Lee
(74) *Attorney, Agent, or Firm* — JCIPRNET

(57)     ABSTRACT

A lamp includes: a housing in which an accommodating portion for accommodating a sealed member is arranged; a lens which covers the accommodating portion and is bonded to the housing; and a resin bonding material which is in contact with the housing and the lens and bonds the housing to the lens. Besides, the housing includes, as the accommodating portion, a first accommodating portion having an elongated shape, and a second accommodating portion having an accommodating part wider than that of the first accommodating portion, wherein a first abutting surface of the housing and a second abutting surface of the lens in the second accommodating portion are formed in a manner that the respective surfaces thereof have an uneven shape. The resin bonding material is in contact with a protruding surface of the housing and a wall portion of the lens.

3 Claims, 9 Drawing Sheets

(51) Int. Cl.
    *B29C 45/26*          (2006.01)
    *B29L 31/30*          (2006.01)

(56)                 References Cited

FOREIGN PATENT DOCUMENTS

| | | | |
|---|---|---|---|
| JP | 06179246 | * | 6/1994 |
| JP | H06179246 | | 6/1994 |
| JP | 2008168576 | | 7/2008 |
| JP | 2009023249 | | 2/2009 |
| JP | 2009160972 | * | 7/2009 |
| JP | 2011154825 | | 8/2011 |
| JP | 2016150721 | | 8/2016 |

OTHER PUBLICATIONS

"International Search Report (Form PCT/ISA/210) of PCT/JP2020/038702," mailed on Dec. 15, 2020, with English translation thereof, pp. 1-4.

* cited by examiner ( a )

( b )

INJECTION MOLDED BODY AND METHOD FOR MANUFACTURING SAME

CROSS-REFERENCE TO RELATED APPLICATION

This application is a 371 application of the International PCT application serial no. PCT/JP2020/038702, filed on Oct. 14, 2020, which claims the priority benefits of Japan Patent Application No. 2019-190674, filed on Oct. 18, 2019. The entirety of each of the above-mentioned patent applications is hereby incorporated by reference herein and made a part of this specification.

BACKGROUND

Technical Field

The present invention relates to an injection molded body attached to a door mirror or the like, and a method for manufacturing the same.

Related Art

As an example of an injection molded body attached to a door mirror or the like of an automobile, an injection molded body is known in which a lens and a housing that are respectively injection molded are bonded to each other. For the bonding between the housing and the lens of the injection molded body, a bonding method such as vibration welding using vibration or the like, and a bonding method using a laser can be used.

For example, Patent literature 1 discloses a method for bonding the housing to the lens, and describes a method of bonding a peripheral portion of a lens covered with a housing to the housing by vibration welding.

Literature of Related Art

Patent Literature

Patent literature 1: Japanese Patent Laid-Open No. 2016-150721

SUMMARY

Problems to be Solved

However, in the method for bonding the housing to the lens (vibration welding) described in Patent literature 1, a bonding surface between the housing and the lens must be flat in order to vibrate (rub) a bonding portion between the housing and the lens.

In addition, when the injection molded body has accommodating portions of different sizes, in the bonding between the housing and the lens, due to the influence of a difference in the heat shrinkage rate of resin and a difference in the degree of warpage of each of the housing and the lens, a stress applied to a bonding portion of an accommodating portion having a large size is larger than that of an accommodating portion having a small size, and a deformation at the bonding portion is also likely to occur. As a result, there has been a problem that a bonding strength between the housing and the lens is weakened at the bonding portion in the accommodating portion having a large size.

In addition, in the bonding method using a laser as well, if the bonding surface between the housing and the lens is uneven, the laser is diffusely reflected, and bonding is difficult.

An objective of the present invention is to provide an injection molded body in which a bonding strength between a first molded member and a second molded member is improved, and a method for manufacturing the same.

Means to Solve Problems

One aspect of the present invention includes: a first molded member in which an accommodating portion for accommodating a sealed member is arranged; a second molded member which covers the accommodating portion and is bonded to the first molded member; and a resin bonding material which bonds the first molded member to the second molded member. The first molded member includes, as the accommodating portion, a first accommodating portion having an elongated shape, and a second accommodating portion whose width is wider than the first accommodating portion, and includes a first wall portion in which a first abutting surface that abuts the second molded member is arranged. The second molded member includes a second wall portion in which a second abutting surface that abuts the first abutting surface is arranged. The first wall portion is arranged on a peripheral portion of each of the first accommodating portion and the second accommodating portion, and includes a protruding portion having a protruding surface that is continuous from the first abutting surface and protrudes outward. The second wall portion is arranged on the peripheral portion of each of the first accommodating portion and the second accommodating portion corresponding to the first wall portion. The resin bonding material is in contact with the second wall portion and the protruding surface. Each of the first abutting surface and the second abutting surface in the second accommodating portion includes an uneven portion.

In another aspect of the present invention, the first abutting surface and the second abutting surface are wavy with respect to each other.

In another aspect of the present invention, as the sealed member, a part of a light guide member that guides a light emitted from a light emitting element is accommodated in the first accommodating portion, and the other part of the light guide member and a substrate having a wire electrically connected to the light emitting element are accommodated in the second accommodating portion.

Another aspect of the present invention includes: a first process of injection molding a first molded member having an accommodating portion; a second process of injection molding a second molded member; a third process in which a sealed member is mounted on the accommodating portion of the first molded member, and after this mounting, the first molded member and the second molded member are assembled to form an assembly structure body; and a fourth process in which the assembly structure body is arranged in a cavity of a molding die, and a resin bonding material is filled in a space including a part of the first molded member and a part of the second molded member. The first molded member includes, as the accommodating portion, a first accommodating portion having an elongated shape, and a second accommodating portion whose width is wider than the first accommodating portion, and includes a first wall portion in which a first abutting surface that abuts the second molded member is arranged. The second molded member includes a second wall portion in which a second abutting surface that abuts the first abutting surface is arranged. The first wall portion is arranged on a peripheral portion of each of the first accommodating portion and the second accommodating portion, and includes a protruding portion having a protruding surface that is continuous from the first abutting surface and protrudes outward. The second wall portion is arranged on the peripheral portion of each of the first accommodating portion and the second accommodating portion corresponding to the first wall portion. The part of the first molded member is the protruding portion, and the part of the second molded member is the second wall portion. In the fourth process, in the second accommodating portion, the resin bonding material is filled in a manner of coming into contact with the second wall portion and the protruding surface in a state in which the first abutting surface and the second abutting surface having an uneven portion respectively are made to abut each other, and the first molded member and the second molded member are bonded by the resin bonding material.

Effect

According to the present invention, a bonding strength between a first molded member and a second molded member in an injection molded body can be improved.

BRIEF DESCRIPTION OF THE DRAWINGS

FIG. 1 is a diagram showing a structure of a mirror device to which an injection molded body (lamp) of the present invention is attached, wherein FIG. 1(a) is a rear view and FIG. 1(b) is a front view.

DESCRIPTION OF THE EMBODIMENTS

Figure 1:
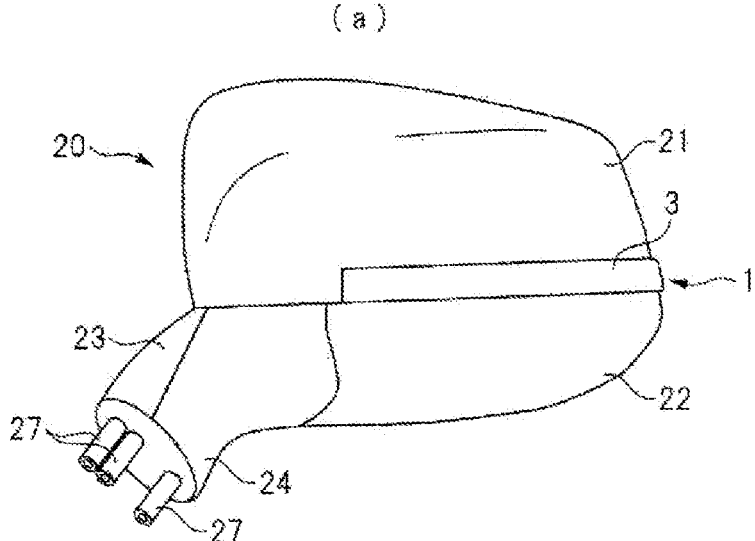
Figure 1:
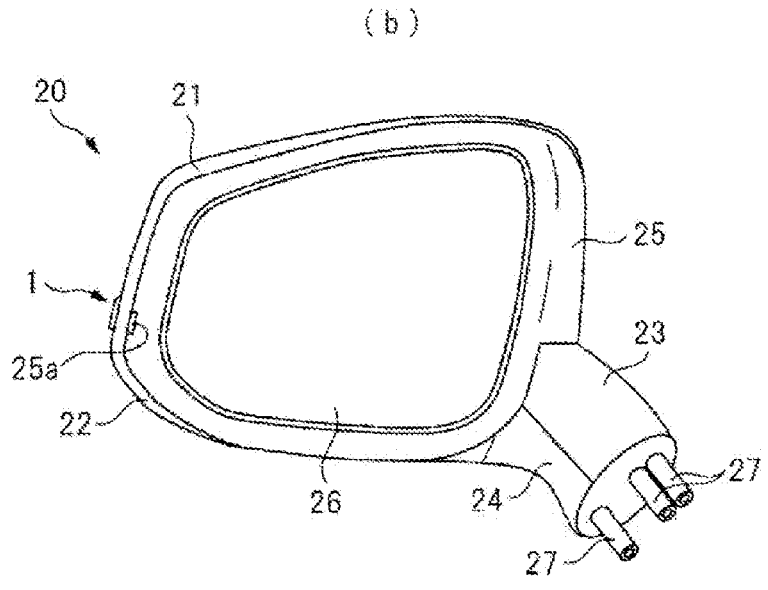

Hereinafter, embodiments of the present invention are described in detail with reference to the drawings.

An injection molded body of the embodiment is assembled to a mirror device attached to a vehicle body of an automobile or the like, for example, a door or a fender. A mirror device 20 shown in FIGS. 1(a) and 1(b) includes:

a stay bracket 27 fixed to the vehicle body; a body 25 attached to the stay bracket 27 via a folding mechanism (not shown); and a mirror 26 accommodated in the body 25. Furthermore, the mirror device 20 includes: a lamp 1 arranged at a location opposite to a location where the mirror 26 is arranged in the body 25; stay covers 23 and 24 covering the stay bracket 27; a main cover 21 covering the periphery of the lamp 1; and a low cover 22 covering the periphery of the lamp 1. In addition, the main cover 21 covers the periphery of the mirror 26.

When a driver operates a switch arranged in the interior of a vehicle, the lamp 1 assembled to the mirror device 20 flashes and serves as a direction indicator.

The lamp 1 of the embodiment is, for example, an injection molded body obtained in a manner that two members which are injection molded respectively by resins different from each other are bonded by a resin bonding material 9.

Figure 2:
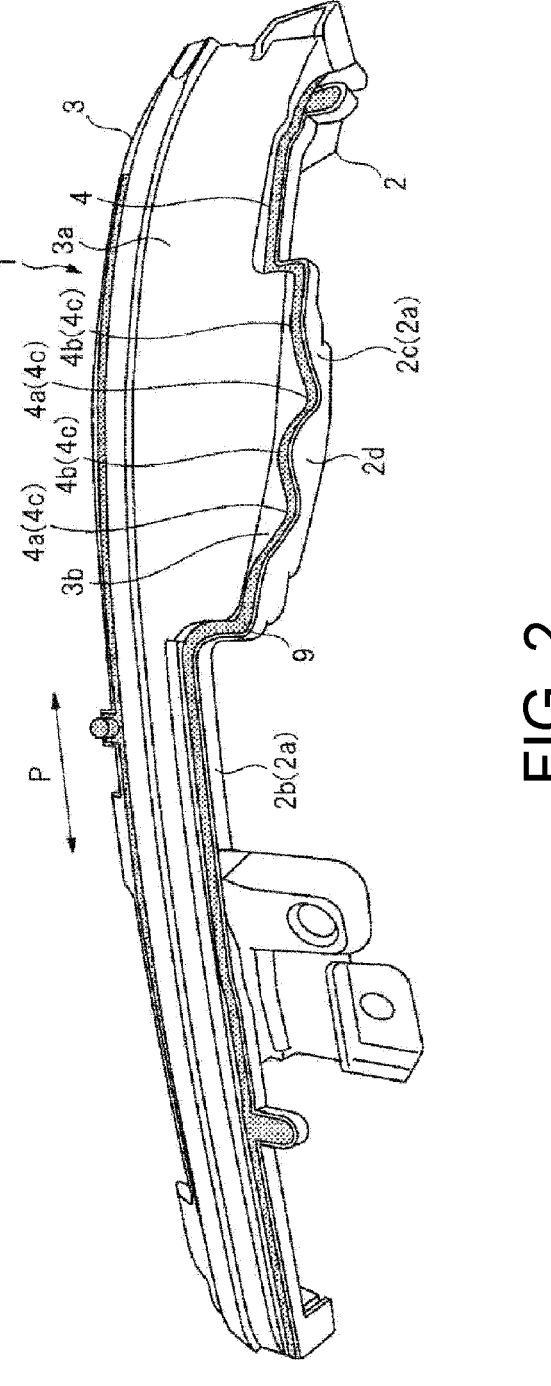
FIG. 2 is a perspective view showing a structure of the injection molded body (lamp) of the present invention.

In the embodiment, as an example of the injection molded body, the lamp 1 attached to a door mirror or the like of an automobile as shown in FIG. 2 is taken up and described. Furthermore, a housing (first molded member) 2 and a lens (second molded member) 3 are taken up as an example of a constituent member of the lamp 1 to describe the configuration of the lamp 1. That is, the injection molded body of the embodiment is the lamp 1 formed by the resin bonding material 9 bonding the housing 2 and the lens 3 molded by injection molding.

Besides, the lamp 1 has a hollow structure, and a sealed member is mounted on a hollow portion (an accommodating portion 2a described later).

Figure 3:
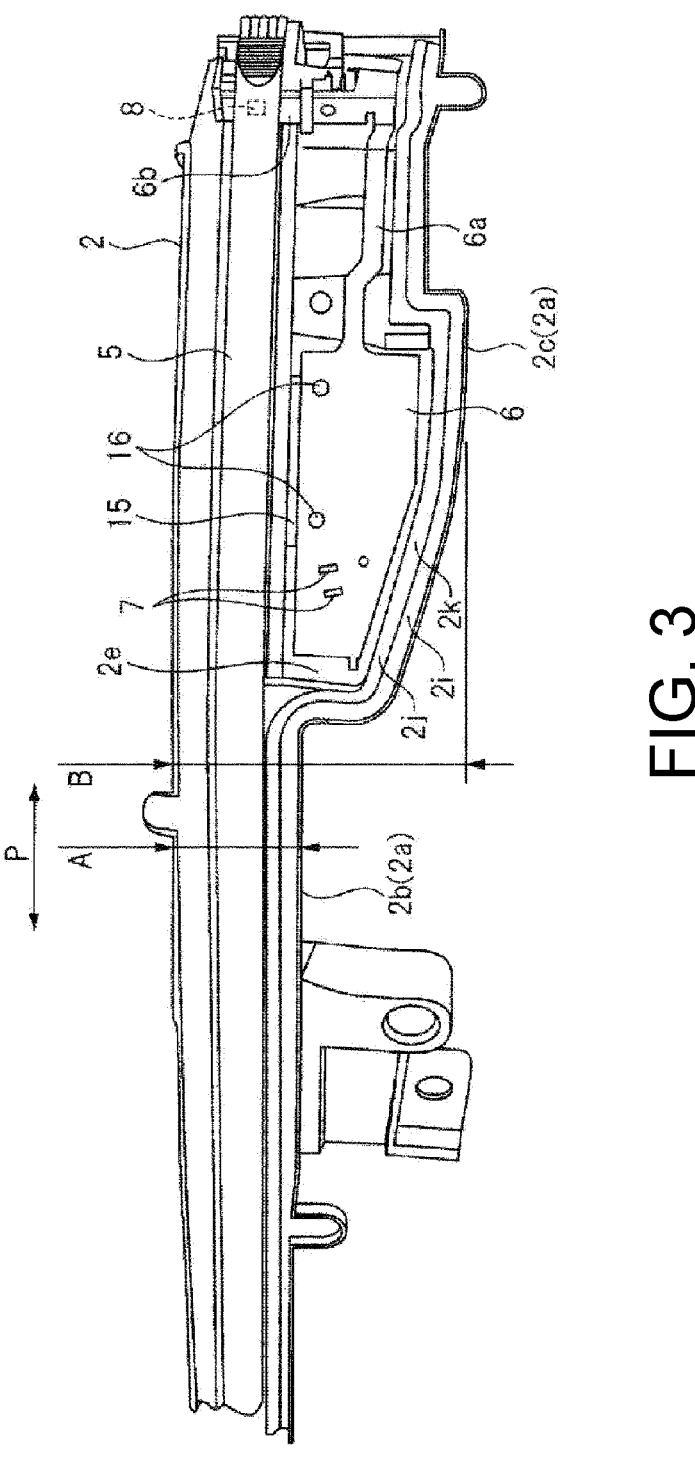
FIG. 3 is a front view showing an internal structure of the injection molded body shown in FIG. 2 with a lens removed.

FIG. 2 is a perspective view of the lamp 1, and FIG. 3 is a front view showing the hollow portion inside the lamp 1 with the lens 3 removed. Moreover, FIG. 2 shows an appearance structure of the lamp 1 when the mirror device 20 in FIG. 1 is viewed from a front side of the automobile. Thus, a vertical direction in FIG. 3 is a width direction of the housing 2 (an extending direction P).

The configuration of the lamp 1 is described as follows. The lamp 1 includes: the housing (first molded member) 2 in which the accommodating portion 2a for accommodating the sealed member is arranged; the lens (second molded member) 3 that covers the accommodating portion 2a and is bonded to the housing 2; and the resin bonding material 9 that is in contact with the housing 2 and the lens 3 and bonds the housing 2 to the lens 3.

Figure 6:
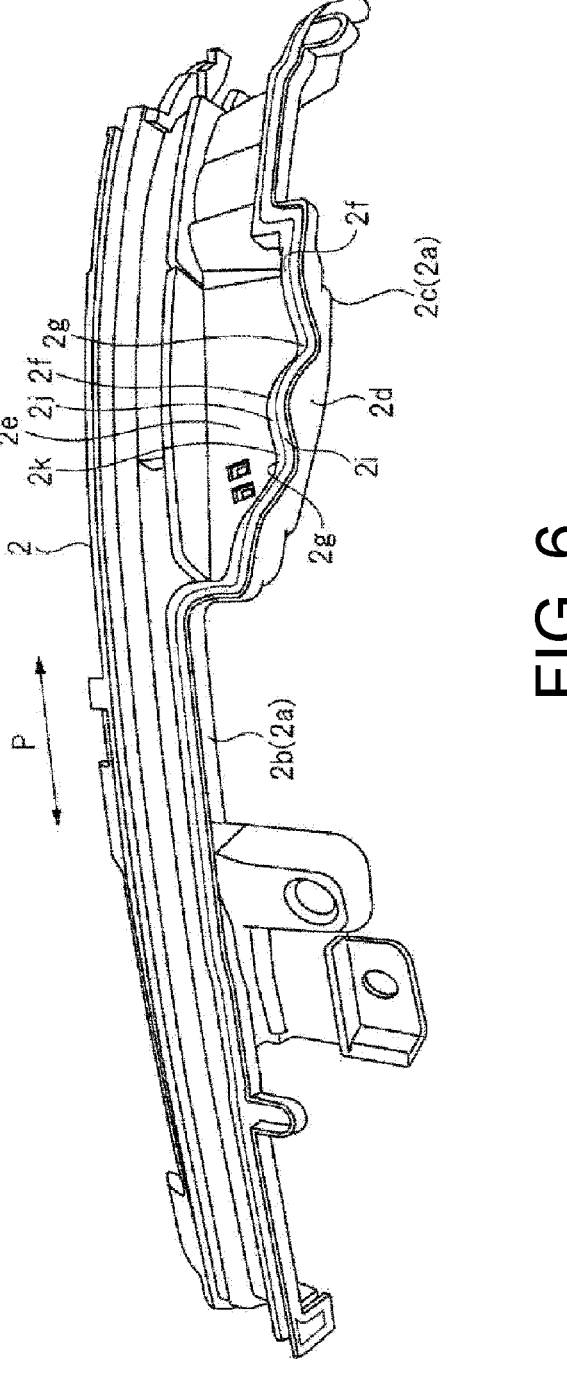
FIG. 6 is a perspective view showing a structure of a housing in the injection molded body shown in FIG. 2.

Moreover, as shown in FIG. 6, the housing 2 includes, as the accommodating portion 2a, a first accommodating portion 2b having an elongated shape when viewed from the front, and a second accommodating portion 2c which is arranged continuously with the first accommodating portion 2b and has an accommodating part whose width is wider than the first accommodating portion 2b when viewed from the front. Specifically, as shown in FIG. 3, the size of a width of the first accommodating portion 2b is A, the size of a width of the second accommodating portion 2c is B, and there is a relationship of A<B. That is, the housing 2 includes the first accommodating portion 2b which is elongated and has a narrow accommodating part, and the second accommodating portion 2c which is continuous with the first accommodating portion 2b and its width is wider than the first accommodating portion 2b. Moreover, in the present invention, the size (area) of the accommodating part of the second accommodating portion 2c is also larger than that of the first accommodating portion 2b. However, the size (area) of the accommodating portion of the first accommodating portion 2b can also be set larger than the size (area) of the accommodating portion of the second accommodating portion 2c.

Figure 4:
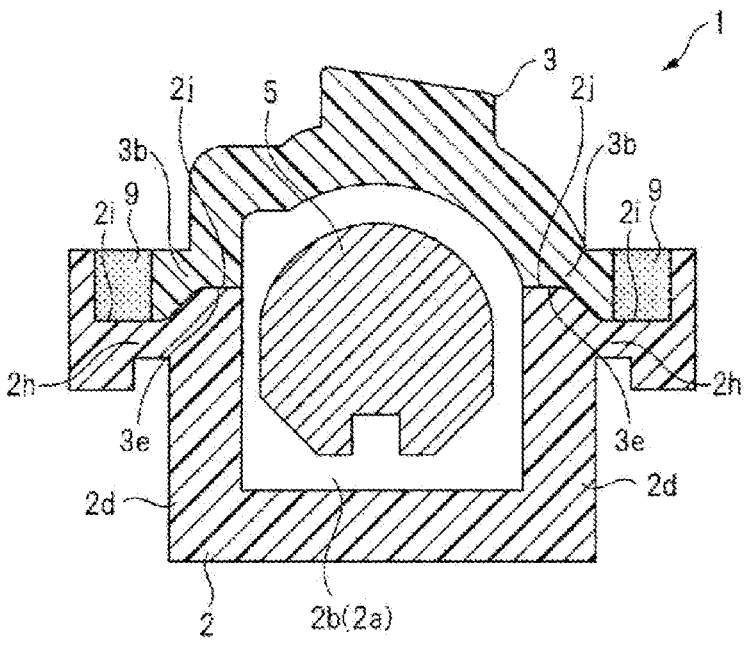
FIG. 4 is an enlarged cross-sectional view showing a structure cut at a first accommodating portion of the injection molded body shown in FIG. 2.
Figure 5:
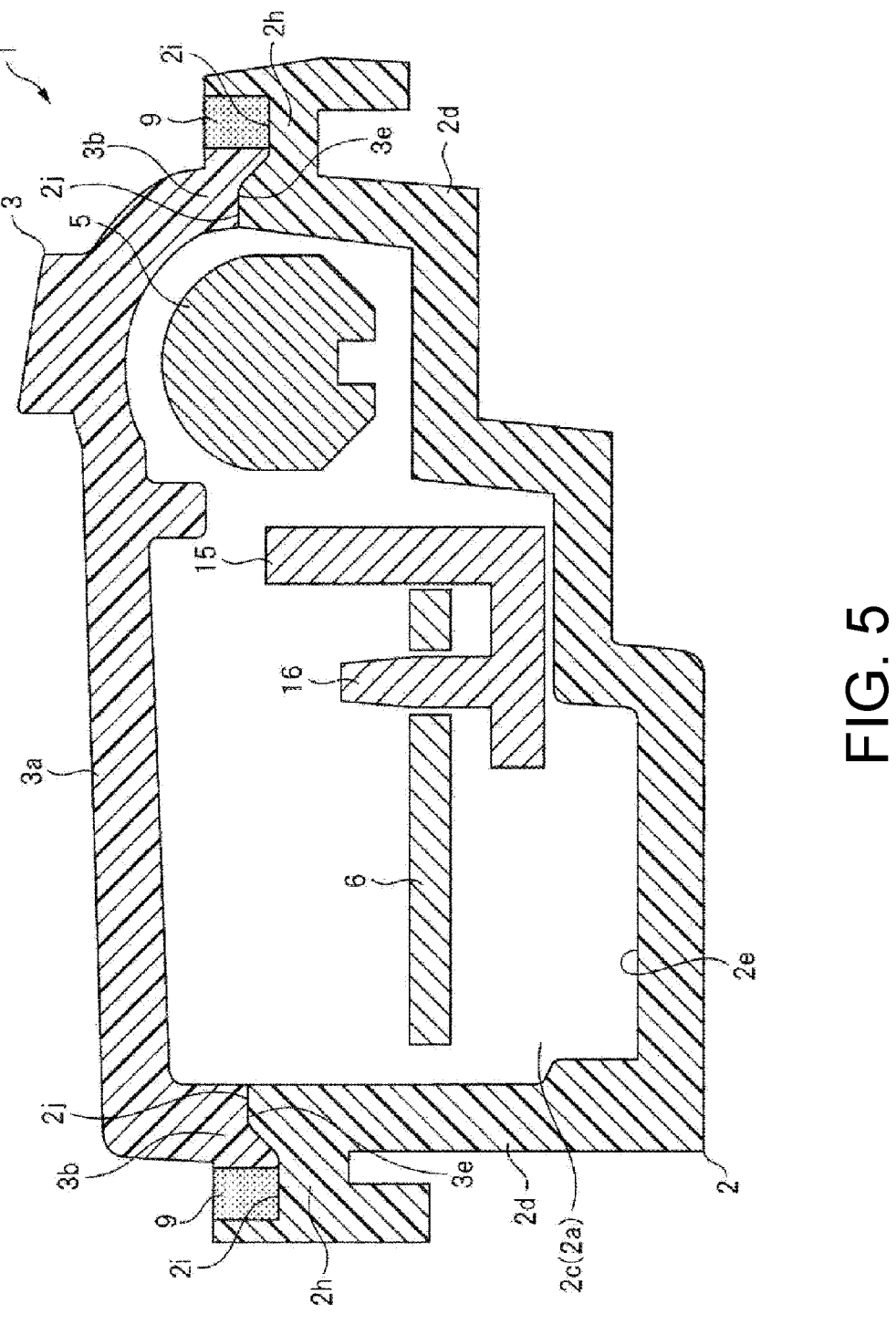
FIG. 5 is enlarged cross-sectional view showing a structure cut at a second accommodating portion of the injection molded body shown in FIG. 2.

Furthermore, as shown in FIGS. 4 and 5, the housing 2 includes a wall portion (first wall portion) 2d in which a first abutting surface 2j that abuts the lens 3 is arranged in the first accommodating portion 2b and the second accommodating portion 2c. On the other hand, the lens 3 includes a wall portion (second wall portion) 3b in which a second abutting surface 3e that abuts the first abutting surface 2j is arranged in a part covering the first accommodating portion 2b and the second accommodating portion 2c. That is, the wall portion 2d is arranged on a peripheral portion of each of the first accommodating portion 2b and the second accommodating portion 2c, and on the other hand, the wall portion 3b is arranged on the peripheral portion of each of the first accommodating portion 2b and the second accommodating portion 2c corresponding to the wall portion 2d. Moreover, the wall portion 2d of the housing 2 includes a protruding portion 2h having a protruding surface 2i that is continuous from the first abutting surface 2j and protrudes outward.

Besides, as shown in FIGS. 4 and 5, the resin bonding material 9 comes into contact with (adheres to) the wall portion 3b of the lens 3 and the protruding surface 2i of the housing 2, and thereby the housing 2 and the lens 3 are bonded by the resin bonding material 9.

In addition, in the lamp 1 of the embodiment, in the second accommodating portion 2c of the housing 2, the first abutting surface 2j of the housing 2 that abuts the lens 3 has an uneven surface 2k, and the second abutting surface 3e of the lens 3 that abuts the housing 2 has an uneven surface 3f. Specifically, regarding the first abutting surface 2j and the second abutting surface 3e in the second accommodating portion 2c, the respective surfaces themselves have a wavy uneven shape along the extending direction P (see FIG. 3) of the housing 2. In other words, the uneven surface 2k and the uneven surface 3f are respectively arranged on a part of each of the wall portion 2d and the wall portion 3b in the second accommodating portion 2c along the extending direction P of the housing 2. Besides, the resin bonding material 9 is arranged over an entire circumference of a bonding portion 4 including the first accommodating portion 2b and the second accommodating portion 2c of the housing 2 at the bonding portion 4 between the housing 2 and the lens 3, and thereby the housing 2 and the lens 3 are bonded.

Here, as shown in FIG. 3, as the sealed member, a light emitting diode (LED) 8 which is a light emitting element and a part of a light guide member 5 that guides a light emitted from the LED 8 toward the lens 3 are accommodated in the first accommodating portion 2b of the housing 2. The light guide member 5 is an elongated member formed of a synthetic resin, for example, an acrylic resin in a tubular shape.

On the other hand, the other part of the light guide member 5 and a substrate 6 having a wire 6a electrically connected to the LED 8 are accommodated in the second accommodating portion 2c that is wide. As shown in FIG. 5, the substrate 6 is attached to a fixing plate 15, and is positioned by two positioning pins 16. In addition, a terminal 7 which is a connection terminal for transmitting/receiving a signal to/from the outside of the lamp 1 is attached to the substrate 6. In addition, the LED 8 is mounted on a sub-substrate 6b accommodated in an end portion of the second accommodating portion 2c, and is arranged inside the light guide member 5.

In the lamp 1, when a voltage is applied to the LED 8 via the wire 6a, the LED 8 lights up. Then, the light emitted from the LED 8 enters the light guide member 5, and is reflected in the light guide member 5. The reflected light passes through the lens 3, and reaches the outside of the lamp 1.

In the housing 2 of the embodiment, the second accommodating portion 2c, which is one portion of the accommodating portion 2a, accommodates the other part of the light guide member (inner lens) 5, the substrate 6, the sub-substrate 6b, and the like, and therefore the second accommodating portion 2c is a wide accommodating portion 2a. On the other hand, the first accommodating portion 2b is an accommodating portion 2a that accommodates a part of the light guide member 5 which is an elongated member. In this way, the lamp 1 of the embodiment can be downsized by forming the housing 2 into a shape in which the first accommodating portion 2b that is narrow and elongated and the second accommodating portion 2c that is wide are combined.

In addition, the housing 2 is made of a non-transparent resin material that does not transmit a light, and on the other hand, the lens 3 is made of a transparent resin material that transmits a light. Thus, the light emitted from the LED 8 is guided to a front end side of the lamp 1 by the light guide member 5, passes through the lens 3, and is emitted to a front side of the lamp 1 (a front side of the automobile). In addition, another LED (not shown) is arranged on the sub-substrate 6b in addition to the LED 8. By the LED, the light passes through the lens 3, and is emitted to a rear side of the lamp 1 (a rear side of the automobile) via a viewing portion (viewing window) 25a. However, because the housing 2 is made of the resin material that does not transmit a light, the housing 2 has a structure in which no light is emitted from any part other than the lens 3.

Moreover, in the housing 2, because the second accommodating portion 2c is wider than the first accommodating portion 2b, the size (area) of the accommodating part of the second accommodating portion 2c is also larger than that of the first accommodating portion 2b. Thus, between the housing 2 and the lens 3 which are made of resin, there is a difference in the heat shrinkage rate of resin of each of the housing 2 and the lens 3, and also a difference in the degree of warpage in the accommodating part. In this case, a large stress is applied to the bonding portion 4 between the housing 2 and the lens 3 in the second accommodating portion 2c in which the size (area) of the accommodating part is large, and a deformation at the bonding portion 4 is also likely to occur. As a result, at the bonding portion 4 in the second accommodating portion 2c having a large size (area), a bonding strength of the bonding portion 4 between the housing 2 and the lens 3 is weakened.

Thus, as shown in FIG. 5, in the lamp 1 of the embodiment, the first abutting surface 2j and the second abutting surface 3e are respectively arranged at an abutting portion (the bonding portion 4 shown in FIG. 2) between the housing 2 and the lens 3 in the second accommodating portion 2c that is wide, and the first abutting surface 2j and the second abutting surface 3e abut each other. Besides, the first abutting surface 2j is the uneven surface 2k, and the second abutting surface 3e is the uneven surface 3f corresponding to an uneven shape of the first abutting surface 2j. In other words, the bonding portion 4 between the housing 2 and the lens 3 includes a concave bonding portion 4a and a convex bonding portion 4b. That is, regarding the first abutting surface 2j and the second abutting surface 3e in the second accommodating portion 2c, the respective surfaces themselves have a wavy uneven shape. Besides, the resin bonding material 9 is in contact with the concave bonding portion 4*a* and the convex bonding portion 4*b*.

In detail, as shown in FIG. 6, the second accommodating portion 2*c* of the housing 2 includes a bottom portion 2*e* and the wall portion 2*d* connected to the bottom portion 2*e*. Besides, in the second accommodating portion 2*c*, a plurality of convex parts 2*f* and a plurality of concave parts 2*g* are continuously arranged at an end portion of the wall portion 2*d* arranged along the extending direction P of the housing 2, and these plurality of convex parts 2*f* and plurality of concave parts 2*g* are formed by a curved line, so that wavy convex parts 2*f* and wavy concave parts 2*g* are formed. That is, the wall portion 2*d* of the second accommodating portion 2*c* of the housing 2 has the first abutting surface 2*j*, and the first abutting surface 2*j* becomes a wavy uneven surface 2*k*.

Moreover, as shown in FIGS. 4 and 5, the housing 2 has the protruding portion 2*h* including the protruding surface 2*i* that is continuous from the first abutting surface 2*j* of the wall portion 2*d* and protrudes outward over an entire circumference. Note that, in the present invention, the protruding portion 2*h* is arranged over the entire circumference, but the protruding portion 2*h* may be arranged partially.

Figure 7:
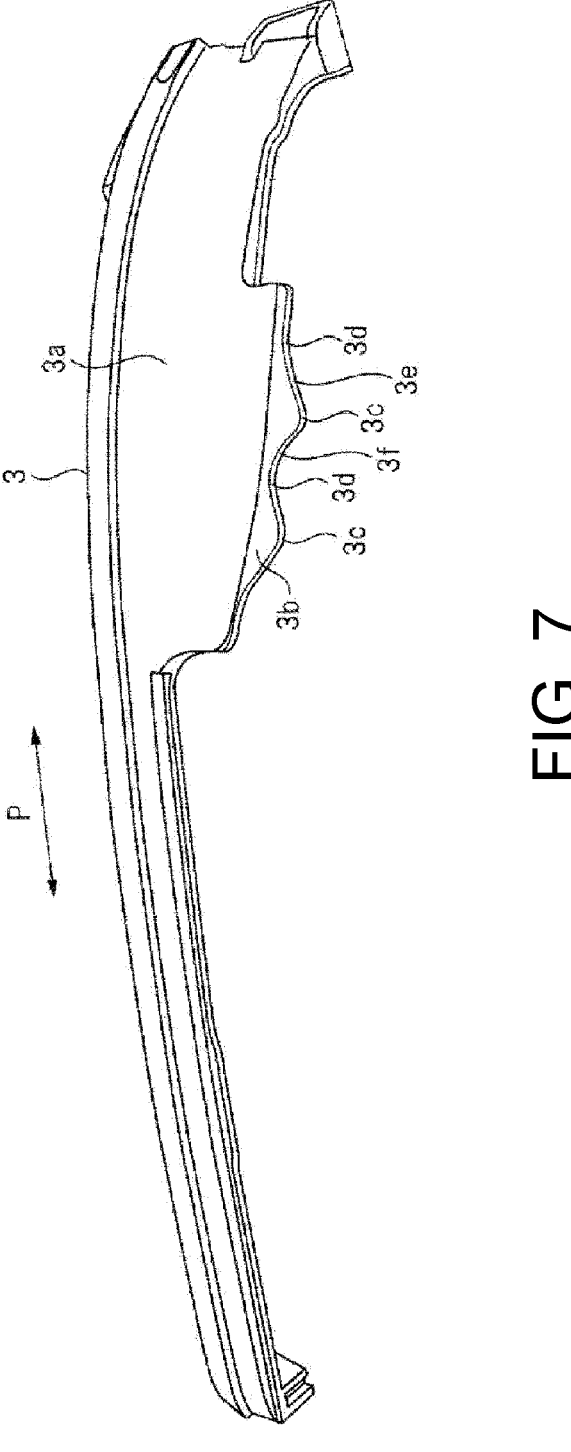
FIG. 7 is a perspective view showing a structure of the lens in the injection molded body shown in FIG. 2.

On the other hand, as shown in FIG. 7, a part of the lens 3 that covers the second accommodating portion 2*c* of the housing 2 includes a top wall 3*a* and the wall portion 3*b* connected to the top wall 3*a*. The wall portion 3*b* is a standing wall of the lens 3 that is connected from the top wall 3*a*. Besides, the wall portion 3*b* arranged along the extending direction P of the lens 3 is shaped to abut the wall portion 2*d* of the housing 2. That is, the second abutting surface 3*e* of the wall portion 3*b* is formed into a shape that matches the first abutting surface 2*j* of the wall portion 2*d* of the housing 2 in order to abut the first abutting surface 2*j* of the wall portion 2*d* of the housing 2. Specifically, similar to the first abutting surface 2*j* of the wall portion 2*d* of the housing 2, a plurality of convex parts 3*c* and a plurality of concave parts 3*d* are continuously arranged on the second abutting surface 3*e* of the wall portion 3*b*, making the second abutting surface 3*e* become the uneven surface 3*f*, and these plurality of convex parts 3*c* and plurality of concave parts 3*d* are formed by a curved line, so that the second abutting surface 3*e* has wavy convex parts 3*c* and wavy concave parts 3*d* (becomes a wavy uneven surface 30).

Thereby, as shown in FIG. 2, the wall portion 2*d* of the housing 2 and the wall portion 3*b* of the lens 3 are engaged with each other, and as shown in FIG. 5, the wall portion 2*d* of the second accommodating portion 2*c* of the housing 2 and the wall portion 3*b* of the lens 3 abut each other by the first abutting surface 2*j* and the second abutting surface 3*e*.

Besides, as shown in FIGS. 4 and 5, at the bonding portion 4 between the housing 2 and the lens 3, because the protruding portion 2*h* including the protruding surface 2*i* is arranged over the entire circumference of the housing 2 in the wall portion 2*d* of the housing 2, by bringing the resin bonding material 9 into contact with the protruding surface 2*i* of the protruding portion 2*h* of the housing 2 and the wall portion 3*b* of the lens 3, the housing 2 and the lens 3 are bonded. In other words, at the bonding portion 4 between the housing 2 and the lens 3, the resin bonding material 9 comes into contact with (adheres to) both the wall portion 2*d* of the housing 2 and the wall portion 3*b* of the lens 3, and thereby the housing 2 and the lens 3 are bonded.

Moreover, the uneven surface 2*k*, which is formed by the plurality of convex parts 2*f* and the plurality of concave parts 2*g* arranged on the first abutting surface 2*j* of the wall portion 2*d* of the second accommodating portion 2*c* of the housing 2, has convex portions and concave portions formed by a curved line with respect to each other, and the curved lines are connected to each other to form a waveform (to form a wavy bonding portion 4*c*). Besides, a curvature of the curved line forming the waveform of each of the plurality of convex parts 2*f* and the plurality of concave parts 2*g* is preferably different variously.

Besides, the lens 3 also has the same shape. That is, the uneven surface 3*f*, which is formed by the plurality of convex parts 3*c* and the plurality of concave parts 3*d* arranged on the second abutting surface 3*e* of the wall portion 3*b* of a part of the lens 3 that covers the second accommodating portion 2*c* of the housing 2, has a shape that matches the plurality of convex parts 2*f* and the plurality of concave parts 2*g* of the wall portion 2*d* of the housing 2. Furthermore, the plurality of convex parts 3*c* and the plurality of concave parts 3*d* of the wall portion 3*b* of the lens 3 have convex portions and concave portions formed by a curved line with respect to each other. Besides, the curved lines of these convex portions and concave portions are connected to form a waveform (to form the wavy bonding portion 4*c*). Moreover, similar to the housing 2, a curvature of the curved line forming the waveform of each of the plurality of convex parts 3*c* and the plurality of concave parts 3*d* is preferably different variously.

Next, a method for manufacturing the lamp 1 of the embodiment is described.

First, the housing (first molded member) 2 shown in FIG. 6 is molded by injection molding. The housing 2 includes the accommodating portion 2*a*.

Furthermore, the lens (second molded member) 3 shown in FIG. 7 is molded by injection molding. However, the housing 2 and the lens 3 may be molded by resin molding other than the injection molding.

Here, the housing 2 shown in FIG. 6 is made of a non-transparent resin material that does not transmit a light, and includes, as the accommodating portion 2*a*, the first accommodating portion 2*b* having an elongated shape, and the second accommodating portion 2*c* that is continuous with the first accommodating portion 2*b* and its width is wider than the first accommodating portion 2*b*.

The first abutting surface 2*j* of the end portion of the wall portion 2*d* of the second accommodating portion 2*c* of the housing 2 includes the uneven surface 2*k* formed in a manner that the plurality of convex parts 2*f* and the plurality of concave parts 2*g* are continuously arranged, and these plurality of convex parts 2*f* and plurality of concave parts 2*g* are formed by a curved line, so that the wavy convex parts 2*f* and the wavy concave parts 2*g* are formed.

On the other hand, the lens 3 shown in FIG. 7 is made of a transparent resin material that transmits a light. The second abutting surface 3*e* of the end portion of the wall portion 3*b* of a part of the lens 3 that covers the second accommodating portion 2*c* of the housing 2 includes the uneven surface 3*f* formed in a manner that the plurality of convex parts 3*c* and the plurality of concave parts 3*d* are continuously arranged. These plurality of convex parts 3*c* and plurality of concave parts 3*d* have a shape that matches the plurality of convex parts 2*f* and the plurality of concave parts 2*g* of the wall portion 2*d* of the housing 2, and the plurality of convex parts 3*c* and the plurality of concave parts 3*d* of the wall portion 3*b* of the lens 3 have convex portions and concave portions formed by a curved line with respect to each other. Furthermore, the curved lines of these convex portions and concave portions are connected to form a waveform.

Next, as shown in FIG. 3, the sealed member is mounted on the accommodating portion 2*a* of the housing 2. Here, a part of the light guide member 5 is mounted on the first accommodating portion 2*b* of the housing 2, and the substrate 6, the wire 6*a*, the sub-substrate 6*b*, and the like are mounted on the second accommodating portion 2*c* of the housing 2. Moreover, the other part of the light guide member 5 is also accommodated in the second accommodating portion 2*c*. Then, after the sealed member such as the light guide member 5, the substrate 6, and the like are mounted, the housing 2 and the lens 3 are assembled to form an assembly structure body 13 shown in FIG. 8.

At that time, in the second accommodating portion 2*c* of the housing 2, the plurality of convex parts 2*f* and the plurality of concave parts 2*g* of the first abutting surface 2*j* of the wall portion 2*d* are matched with the plurality of convex parts 3*c* and the plurality of concave parts 3*d* of the second abutting surface 3*e* of the wall portion 3*b* of the lens 3.

Figure 8:
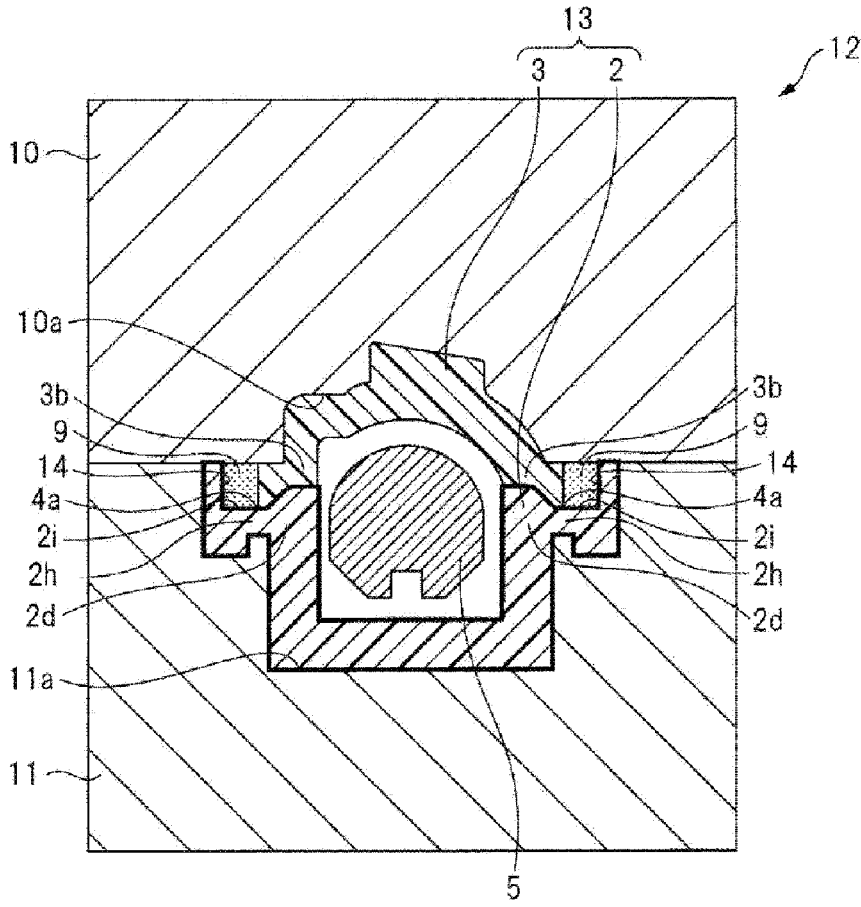
FIG. 8 is a cross-sectional view showing a state in which a resin bonding material is filled in a molding die during the manufacture of the injection molded body shown in FIG. 2.

In this state, as shown in FIG. 8, the assembly structure body 13 is arranged in a cavity 10*a* of an upper die 10 and a cavity 11*a* of a lower die 11 of a molding die 12. After the arrangement, the resin bonding material 9 is filled in a space 14 including the protruding surface 2*i* of the protruding portion 2*h* of the housing 2, the wall portion 3*b* of the lens 3, and a part of the upper die 10 of the molding die 12.

Here, as shown in FIGS. 4 and 5, when the resin bonding material 9 is filled, the resin bonding material 9 is filled in a manner of coming into contact with the wall portion 3*b* and the protruding surface 2*i*. Then, as shown in FIG. 8, the housing 2 and the lens 3 are bonded by the resin bonding material 9. Thereby, as shown in FIGS. 4 and 5, in the housing 2 and the lens 3 in the second accommodating portion 2*c*, there is a structure in which the wall portion 2*d* including the uneven surface 2*k* and the wall portion 3*b* including the uneven surface 3*f* are bonded.

According to the lamp 1 of the embodiment, as for the bonding between the housing 2 and the lens 3, in the second accommodating portion 2*c* in which the size (area) of the accommodating part is large, the first abutting surface 2*j* of the wall portion 2*d* becomes the uneven surface 2*k*, and the second abutting surface 3*e* of the wall portion 3*b* becomes the uneven surface 3*f* corresponding to the uneven surface 2*k*, and thereby a bonding area between the first abutting surface 2*j* and the second abutting surface 3*e* can be increased (a bonding distance between the first abutting surface 2*j* and the second abutting surface 3*e* can be lengthened). As a result, the bonding strength between the housing 2 and the lens 3 in the second accommodating portion 2*c* can be improved.

That is, in the lamp (injection molded body) 1, the bonding strength between the housing 2 and the lens 3 can be improved. Particularly, in the second accommodating portion 2*c* in which the size (area) of the accommodating part is large, even if the heat shrinkage rates of resin of the housing 2 and the lens 3 are different from each other, or the degrees of warpage of the housing 2 and the lens 3 are different from each other, by improving the bonding strength between the housing 2 and the lens 3, the housing 2 and the lens 3 can be prevented from being peeled off.

Moreover, in the bonding between the housing 2 and the lens 3 in the second accommodating portion 2*c*, the uneven surface 2*k* and the uneven surface 3*f* are formed into a waveform with respect to each other, and thereby the waveform is formed by a curved line. Therefore, when the resin bonding material 9 is filled in the molding die 12, the flow of the resin bonding material 9 can be smoothed, and the formation of voids and sink marks can be prevented at the time of bonding.

In addition, in the lamp 1 of the embodiment, as shown in FIG. 2, the part of the lens 3 that covers the second accommodating portion 2*c* of the housing 2 includes the top wall 3*a* and the wall portion 3*b* connected to the top wall 3*a*, and as shown in FIG. 7, the plurality of convex parts 3*c* and the plurality of concave parts 3*d* are arranged on the second abutting surface 3*e* of the wall portion 3*b*. That is, the part of the lens 3 that covers the second accommodating portion 2*c* includes the wall portion 3*b* that is a standing wall connected to the top wall 3*a*, and thereby the strength of the lens 3 can be improved.

Next, variation examples of the embodiment are described.

Figure 9:
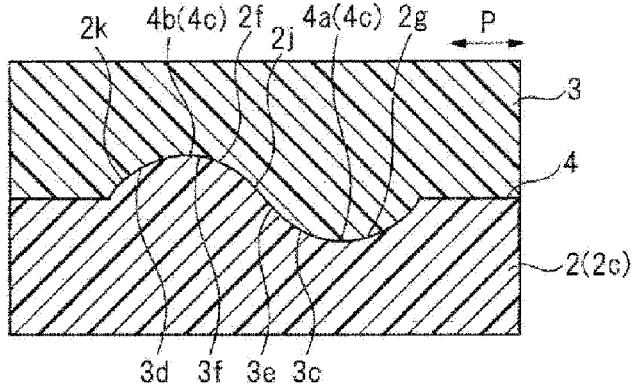
FIG. 9 is a cross-sectional view showing a shape of a first variation example of a bonding portion of the injection molded body of the present invention.

In a first variation example shown in FIG. 9, an S-shaped uneven surface 2*k* is formed on the first abutting surface 2*j* of the housing 2 in the second accommodating portion 2*c* of the housing 2, and an S-shaped uneven surface 3*f* is formed on the second abutting surface 3*e* of the lens 3. That is, an S-shaped abutting surface consisting the uneven surface 2*k* and the uneven surface 3*f* is formed on the abutting surfaces of the housing 2 and the lens 3 in the second accommodating portion 2*c*.

Thereby, similar to the lamp 1 shown in FIG. 2, in the bonding between the housing 2 and the lens 3 in the second accommodating portion 2*c*, the bonding area between the first abutting surface 2*j* and the second abutting surface 3*e* can be increased (the bonding distance can be lengthened), and the bonding strength between the housing 2 and the lens 3 in the second accommodating portion 2*c* in which the size (area) of the accommodating part is large can be improved. That is, in the lamp 1, the bonding strength between the housing 2 and the lens 3 can be improved.

In addition, the S-shaped uneven surface 2*k* and the S-shaped uneven surface 3*f* are formed on the first abutting surface 2*j* and the second abutting surface 3*e* of the second accommodating portion 2*c*, and thereby the S-shape is formed by a curved line. Therefore, when the resin bonding material 9 is filled in the molding die 12 shown in FIG. 8, the flow of the resin bonding material 9 can be smoothed, and the formation of voids and sink marks can be prevented at the time of bonding.

Figure 10:
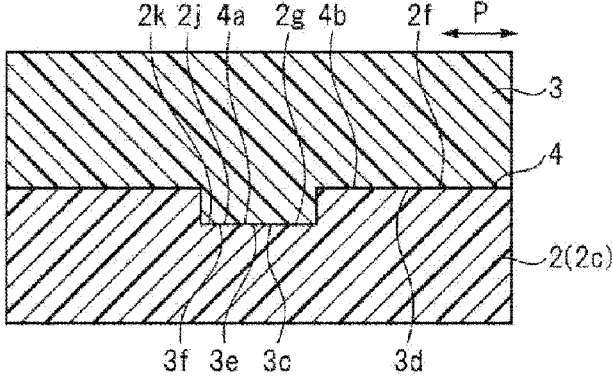
FIG. 10 is a cross-sectional view showing a shape of a second variation example of the bonding portion of the injection molded body of the present invention.

In a second variation example shown in FIG. 10, an uneven surface 2*k* and an uneven surface 3*f* mutually having corner portions are formed on the first abutting surface 2*j* and the second abutting surface 3*e* of the housing 2 and the lens 3 in the second accommodating portion 2*c* of the housing 2.

Figure 11:
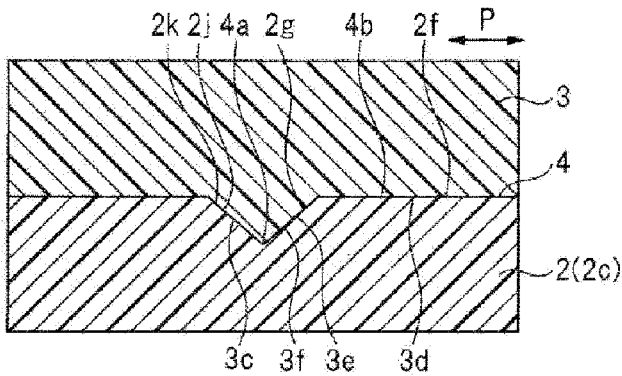
FIG. 11 is a cross-sectional view showing a shape of a third variation example of the bonding portion of the injection molded body of the present invention.

In addition, in a third variation example shown in FIG. 11, an uneven surface 2*k* and an uneven surface 3*f* that form a V-shape are formed on the first abutting surface 2*j* and the second abutting surface 3*e* of the housing 2 and the lens 3 in the second accommodating portion 2*c* of the housing 2.

Similar to the lamp 1 shown in FIG. 2, in the uneven surface 2*k* and the uneven surface 3*f* shown in FIG. 10 that mutually have corner portions, and in the uneven surface 2*k* and the uneven surface 3*f* shown in FIG. 11 that form a V-shape, the bonding area between the first abutting surface 2*j* and the second abutting surface 3*e* can also be increased (the bonding distance can also be lengthened) in the bonding between the housing 2 and the lens 3 in the second accommodating portion 2*c*. Thereby, the bonding strength between the housing 2 and the lens 3 in the second accommodating portion 2*c* in which the area of the accommodating part is large can be improved. That is, in the lamp 1, the bonding strength between the housing 2 and the lens 3 can be improved.

Needless to say, the present invention is not limited to the above-described embodiments, and various modifications can be made without departing from the gist thereof. For example, in the above-described embodiments, a case has been described in which the first abutting surface 2*j* of the housing 2 and the second abutting surface 3*e* of the lens 3 themselves are corrugated into an uneven shape. However, uneven portions may be formed on a part of the respective surfaces of the first abutting surface 2*j* and the second abutting surface 3*e* of the second accommodating portion 2*c*. That is, the first abutting surface 2*j* and the second abutting surface 3*e* in the second accommodating portion 2*c* may include uneven portions on a part of the respective surfaces thereof. For example, one or more uneven portions may be formed on each of the first abutting surface 2*j* and the second abutting surface 3*e*. Thereby, the bonding strength between the housing 2 and the lens 3 can be improved.

In addition, in the above-described embodiments, a case has been described in which the first abutting surface 2*j* of the housing 2 and the second abutting surface 3*e* of the lens 3 are formed into a waveform, an S-shape, the uneven surface 2*k* and the uneven surface 3*f* mutually having corner portions, a V-shape, and the like. However, the shapes of the first abutting surface 2*j* of the housing 2 and the second abutting surface 3*e* of the lens 3 are not limited to the above shapes, as long as the shapes can increase the bonding area (lengthen the bonding distance) between the first abutting surface 2*j* and the second abutting surface 3*e*.

In addition, a location where the uneven surface 2*k* and the uneven surface 3*f* are arranged as described above is not limited to the second accommodating portion 2*c*. The uneven surface 2*k* and the uneven surface 3*f* may be arranged at other locations, for example, on a part or the entire circumference of the abutting portion (the bonding portion 4) between the housing 2 and the lens 3 of the first accommodating portion 2*b*, and the like.

What is claimed is:

1. An injection molded body, comprising:
a first molded member in which an accommodating portion for accommodating a sealed member is arranged;
a second molded member which covers the accommodating portion and is bonded to the first molded member, wherein the heat shrinkage rate of resin of each of the first molded member and the second molded member is different from each other; and
a resin bonding material which bonds the first molded member to the second molded member;
wherein the first molded member comprises, as the accommodating portion, a first accommodating portion having an elongated shape along an extending direction of the first molded member, and a second accommodating portion whose width is wider than the first accommodating portion, the first accommodating portion and the second accommodating portion are at two different sides along the extending direction, wherein, in the first molded member, a stress applied to a bonding portion of the second accommodating portion is larger than that applied to a bonding portion of the first accommodating portion, and the first molded member comprises a first wall portion in which a first abutting surface that abuts the second molded member is arranged;
the second molded member comprises a second wall portion in which a second abutting surface that abuts the first abutting surface is arranged;

the first wall portion is arranged on a peripheral portion of each of the first accommodating portion and the second accommodating portion, and comprises a protruding portion having a protruding surface that is continuous from the first abutting surface and protrudes outward;
the second wall portion is arranged on the peripheral portion of each of the first accommodating portion and the second accommodating portion corresponding to the first wall portion;
the resin bonding material is in contact with the second wall portion and the protruding surface; and
each of the first abutting surface and the second abutting surface in the second accommodating portion comprises an uneven portion and the first abutting surface and the second abutting surface are in direct contact with each other at the uneven portion of the first abutting surface and the uneven portion of the second abutting surface wherein the first abutting surface and the second abutting surface are wavy with respect to each other.

2. The injection molded body according to claim 1, wherein as the sealed member, a part of a light guide member that guides a light emitted from a light emitting element is accommodated in the first accommodating portion; and
another part of the light guide member and a substrate having a wire electrically connected to the light emitting element are accommodated in the second accommodating portion.

3. A method for manufacturing an injection molded body, comprising:
a first process of injection molding a first molded member having an accommodating portion;
a second process of injection molding a second molded member;
a third process in which a sealed member is mounted on the accommodating portion of the first molded member, and after this mounting, the first molded member and the second molded member are assembled to form an assembly structure body; and
a fourth process in which the assembly structure body is arranged in a cavity of a molding die, and a resin bonding material is filled in a space comprising a part of the first molded member and a part of the second molded member;
wherein the first molded member comprises, as the accommodating portion, a first accommodating portion having an elongated shape along an extending direction of the first molded member, and a second accommodating portion whose width is wider than the first accommodating portion, the first accommodating portion and the second accommodating portion are at two different sides along the extending portion, wherein, in the first molded member, a stress applied to a bonding portion of the second accommodating portion is larger than that applied to a bonding portion of the first accommodating portion, and the first molded member comprises a first wall portion in which a first abutting surface that abuts the second molded member is arranged;
the second molded member comprises a second wall portion in which a second abutting surface that abuts the first abutting surface is arranged;
the first wall portion is arranged on a peripheral portion of each of the first accommodating portion and the second accommodating portion, and comprises a protruding portion having a protruding surface that is continuous from the first abutting surface and protrudes outward;

the second wall portion is arranged on the peripheral portion of each of the first accommodating portion and the second accommodating portion corresponding to the first wall portion;

the part of the first molded member is the protruding portion, and the part of the second molded member is the second wall portion; and in the fourth process, in the second accommodating portion, the resin bonding material is filled in a manner of coming into contact with the second wall portion and the protruding surface in a state in which the first abutting surface and the second abutting surface having an uneven portion respectively are made to abut each other and the first abutting surface and the second abutting surface are in direct contact with each other at the uneven portion of the first abutting surface and the uneven portion of the second abutting surface wherein the first abutting surface and the second abutting surface are wavy with respect to each other, and the first molded member and the second molded member are bonded by the resin bonding material.

\*　\*　\*　\*　\*